No. 842,440. PATENTED JAN. 29, 1907.
G. W. WYSOR.
KITCHEN CABINET.
APPLICATION FILED OCT. 18, 1906.
5 SHEETS—SHEET 3.
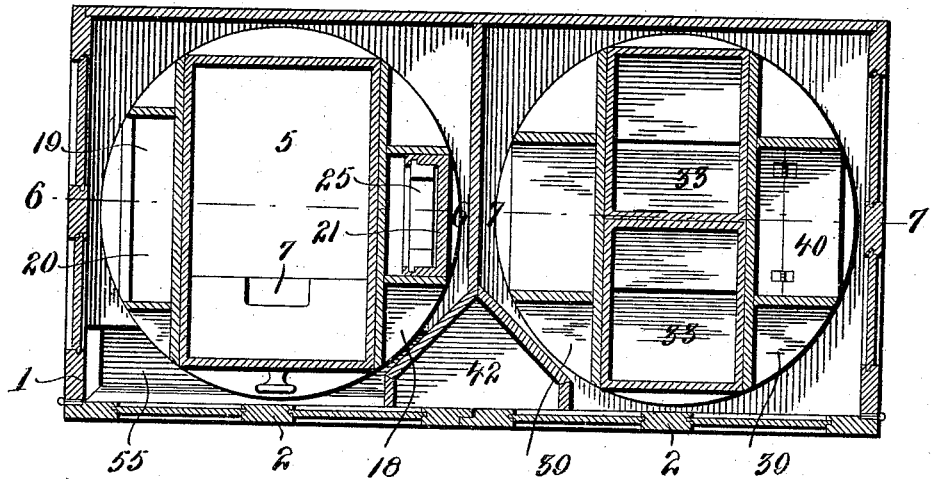
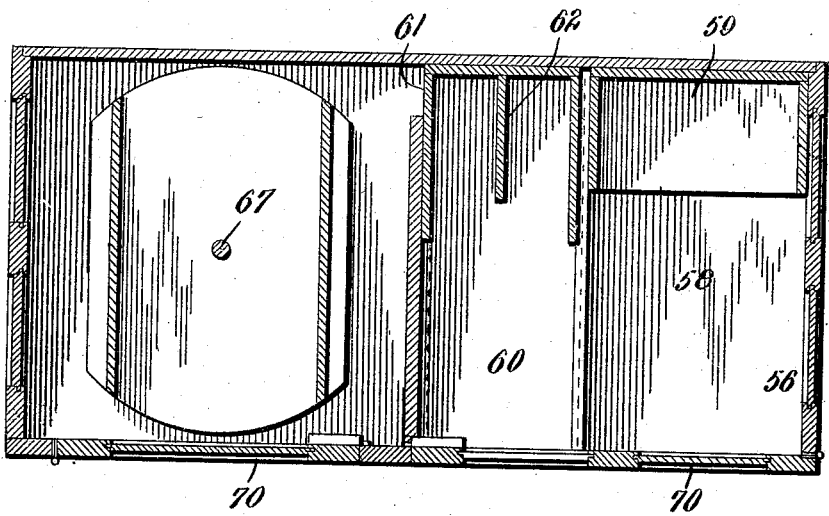
WITNESSES:
INVENTOR
George W. Wysor,
BY Franklin N. Hough
Attorney

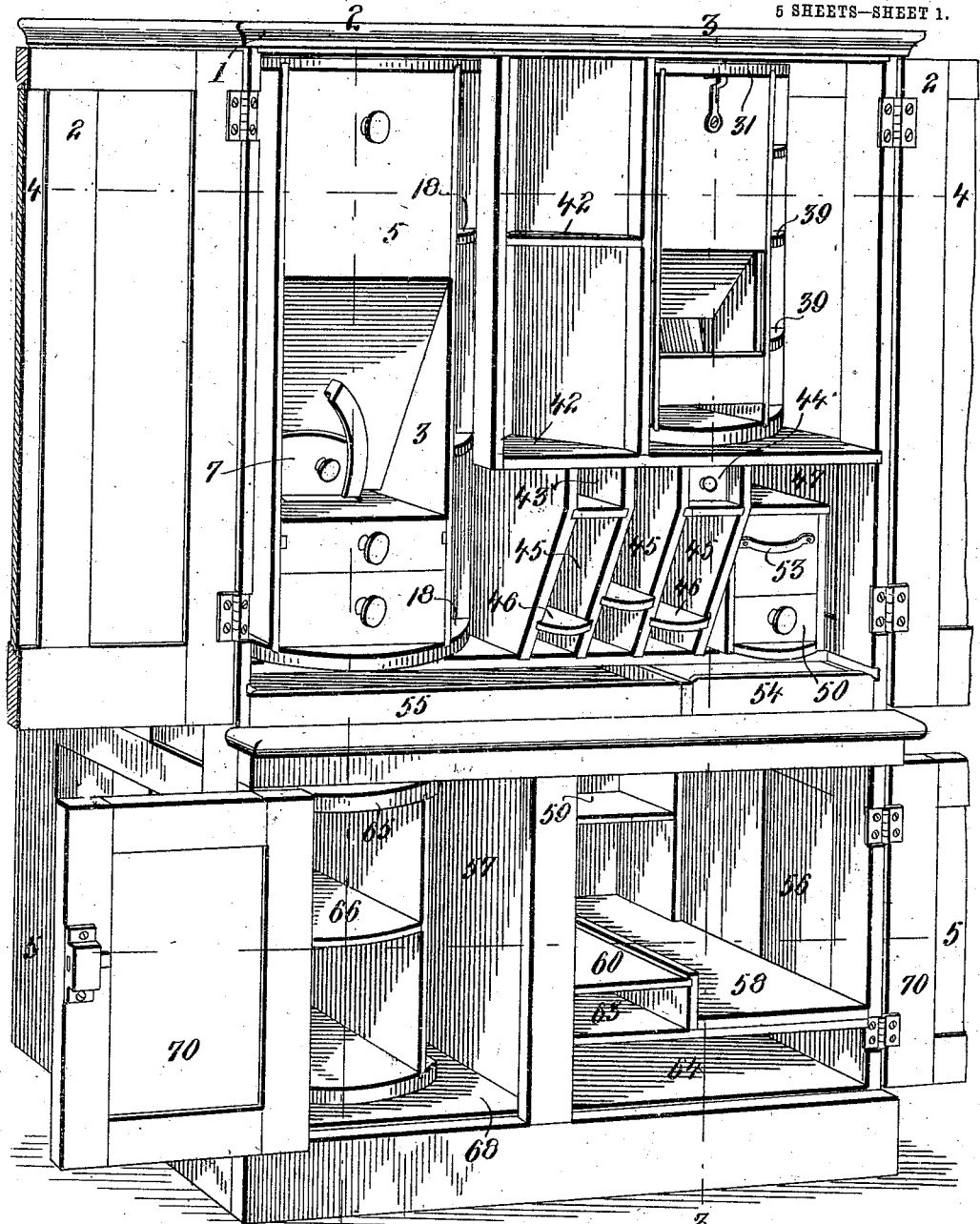

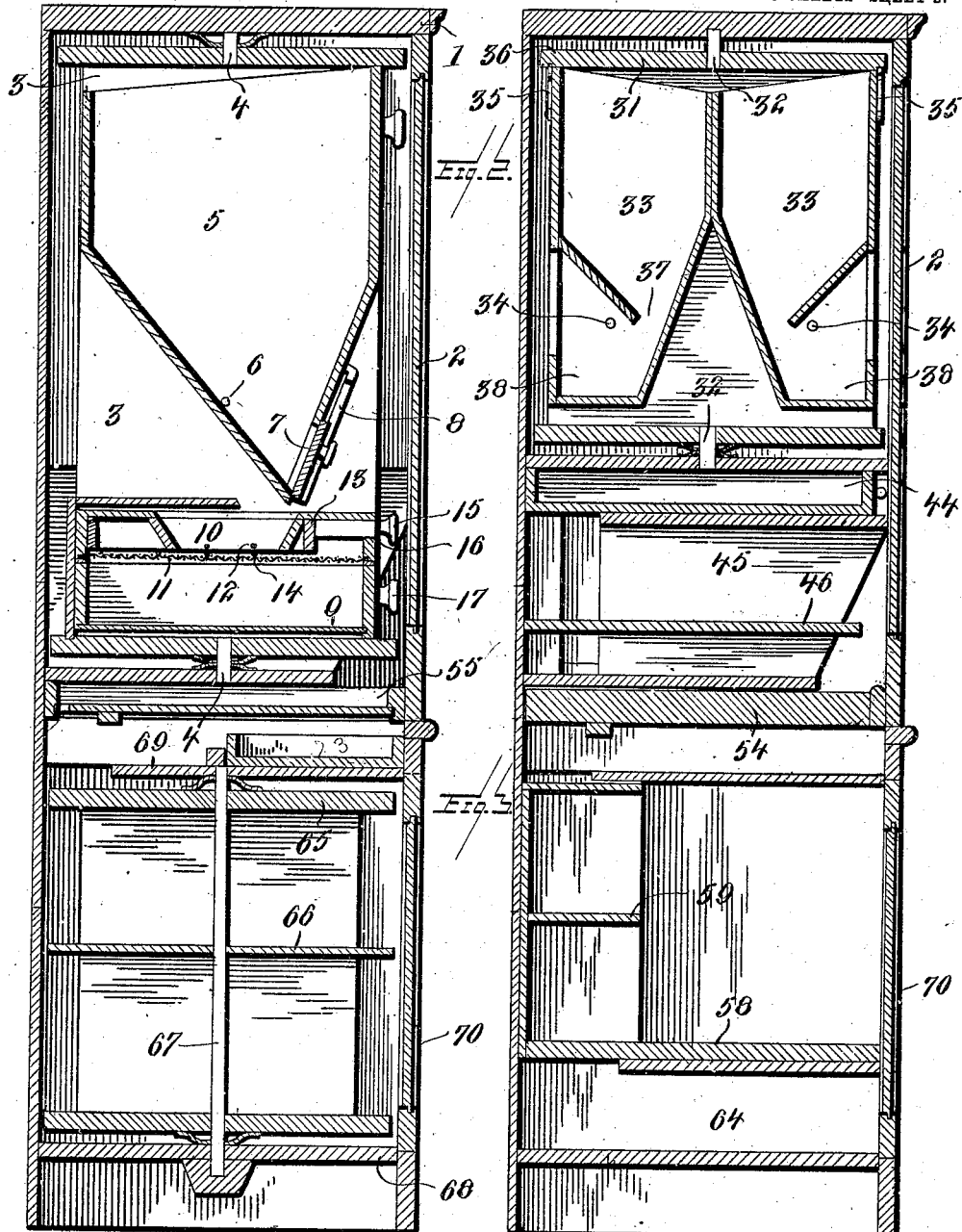

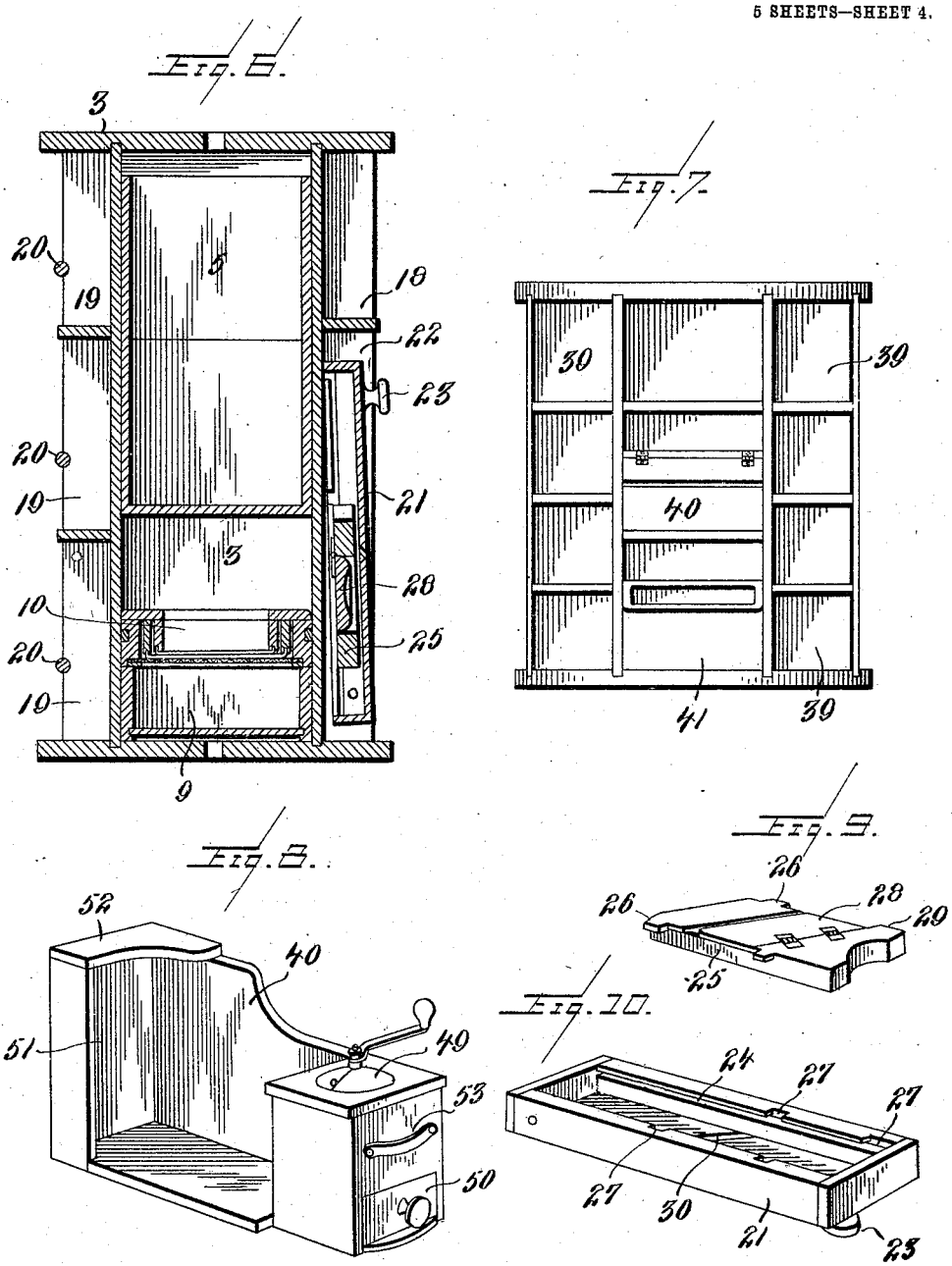

No. 842,440. PATENTED JAN. 29, 1907.
G. W. WYSOR.
KITCHEN CABINET.
APPLICATION FILED OCT. 18, 1906.
5 SHEETS—SHEET 5.
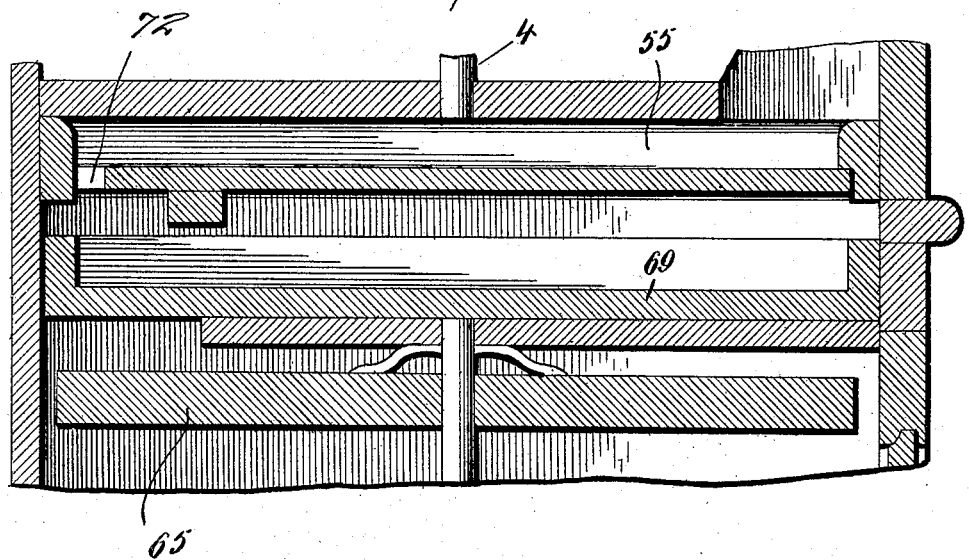
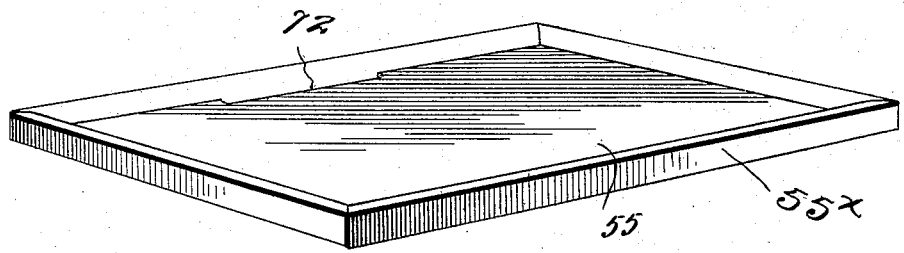

UNITED STATES PATENT OFFICE.

GEORGE WASHINGTON WYSOR, OF HUNTINGTON, WEST VIRGINIA, ASSIGNOR OF ONE-HALF TO H. X. MORTON, JR., OF BRAMWELL, WEST VIRGINIA.

KITCHEN-CABINET.

No. 842,440.　　　　Specification of Letters Patent.　　　Patented Jan. 29, 1907.

Application filed October 18, 1906. Serial No. 339,555.

*To all whom it may concern:*

Be it known that I, GEORGE WASHINGTON WYSOR, a citizen of the United States, residing at Huntington, in the county of Cabell and State of West Virginia, have invented certain new and useful Improvements in Kitchen-Cabinets; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a kitchen-cabinet, and has for an object to provide a simple and efficient construction in which the maximum of storage-space for the various articles of culinary use may be provided and such articles supported in most convenient positions for access in the use thereof.

Other and further objects and advantages of the invention will be hereinafter set forth and the novel features thereof defined in the appended claims.

In the drawings, Figure 1 is a perspective view of the invention. Fig. 2 is a vertical sectional view on line 2 2 of Fig. 1. Fig. 3 is a similar section on line 3 3 of Fig. 1. Fig. 4 is a horizontal section on line 4 4 of Fig. 1. Fig. 5 is a similar section on line 5 5. Fig. 6 is a detail vertical section on line 6 6 of Fig. 4. Fig. 7 is a similar section of the rotatable holder on line 7 7 of Fig. 4. Fig. 8 is a detail perspective view of the removable holder for a grinding-mill. Fig. 9 is a detail perspective view of the sliding block of a vegetable-cutter. Fig. 10 is a similar view of the frame carrying this block. Fig. 11 is a sectional view vertically through the kneading-board and tray underneath the same, and Fig. 12 is an enlarged perspective view of the kneading-board.

Like numerals of reference indicate like parts in the several figures of the drawings.

The numeral 1 designates a casing, which may be of any desired construction or configuration and is provided with an upper and lower division in which the various compartments are provided. This casing is also provided with the usual inclosing doors 2 and at the upper portion thereof has mounted therein a rotatable holder 3, as shown in Fig. 2, which holder is provided with pivots 4 at its opposite ends and comprises, essentially, a flour-bin 5, which is pivotally mounted at its lower portion 6 to swing outwardly for the purpose of introducing material therein and at its lower portion provided with a discharge-gate 7, slidingly mounted and operating within a guide 8. Beneath the flour-bin a drawer 9 is provided, while above this drawer is a slidingly-mounted casing 10, having secured to its lower portion a circular screen 11, while spaced from this screen are a series of transverse rods 12. A rack 13 is slidingly mounted within the casing and provided with transverse rods 14, disposed between the rods 12 and the screen, so as to frictionally bear upon the latter. The rack is provided with an operating-handle 15, guided by an aperture 16 in the casing, through which it passes. The drawer 9 to receive the sifted flour is also provided with a handle 17 of the usual construction. This rotatable holder is also provided with a series of shelves 18, adapted to retain any desired article, and also with shelves 19, provided with a guard-rail 20, Fig. 6, which may be used for supporting plates or similar articles. The holder is provided also with a pivotally-mounted vegetable-cutter 21, disposed in a recess 22 thereof and provided with a handle 23, by which it may be swung outward into horizontal position. This cutter comprises a frame having a slideway 24 therein, in which the block or plate 25 is adapted to fit and to be held by means of a lug 26 at opposite sides thereof, which in the introduction of the plate into position pass through corresponding recesses 27 in the upper surface of the frame. This plate is also provided with a pivoted pressure-plate 28, mounted upon a sliding plate 29 so as to hold the vegetable or material to be cut against the cutter 30, carried by the main frame 23. It will be seen that this cutter when out of use may be completely folded within the holder, as shown in Fig. 6. At the right of the cabinet (shown in Fig. 1) is a second rotatable holder 31, which, as shown in Fig. 3, is mounted by means of pivots 32 at its opposite ends and provided with bins 33, pivotally mounted at their lower portions 34 and adapted when closed to swing into contact with each other, as shown in Fig. 3, and to be secured by swinging latches 35, engaging the upper plate 36 of the holder. These bins swing outward to be filled and are adapted to be used for sugar and meal. They are provided at the lower portion with a discharge-opening 37 and a pocket 38, adapted to contain material ready for use. This holder is also provided with shelves 39 to retain any desired articles and with inclosed pockets 40, adapted to retain baking powder or soda, which should be protected from moisture, while at its lower portion a salt-box 41 may be mounted. Intermediate these rotatable holders are shelves 42. Beneath the holder 31 is a receptacle 43, adapted to receive a rolling-pin, and a drawer 44 for small articles. A series of parallel receptacles 45 are also formed by the partition-walls and each provided with a sliding bottom 46, upon which any desired tools—such as an apple-parer, meat-chopper, and cherry-stoner—may be mounted. At the extreme right a compartment 47 is formed adapted to receive the coffee-holder 48, as shown in Fig. 8. This comprises the grinding-mill 49, mounted at one end thereof and provided with the receiving-drawer 50, while the opposite end is partially inclosed with a vertical wall 51 and a brace 52, so as to form a receptacle for coffee and tea pots, and all of these articles may be withdrawn from the cabinet for use as the holder is bodily removed therefrom and provided with a handle 53 for that purpose. Beneath this holder a steak-tendering board 54 is mounted, while at the left is a bread or pastry board 55, which may be also used as a shelf.

The lower portion of the cabinet is formed with a right compartment 56 and a left compartment 57, the former being provided with a slidingly-mounted shelf 58, as shown in Fig. 3, adapted for use in bread-making and having at its rear an inclosed shelf 59 to receive any desired articles, while at the opposite side of this compartment a cake-making shelf 60 is slidingly mounted and provided with an inclosed rear portion 61, having a central partition 62. Beneath this board 60 is a compartment 63, adapted to receive pans or similar articles, and beneath both of the boards 58 and 60 is an extended compartment 64 for storage purposes. The left compartment 57 is provided with a rotatable holder 65, having a shelf 66 therein and being pivotally mounted by the rod 67 extending therethrough into the bottom board 68 and the top board 69. These lower compartments are each provided with independent doors 70, which may be separately secured or locked to protect the contents thereof. The pastry or kneading board 55 is provided with a flange or molding 55$^\times$ about its marginal edge and has an elongated slot 72 formed transversely at the inner end thereof, said flange being provided for the purpose of preventing the flour from falling off the board and the elongated aperture provided to allow the flour to fall into the waste-tray 73, positioned underneath the same.

From the foregoing it will be observed that this cabinet provides convenient storage places or compartments for all of the various culinary articles in ordinary use and also a convenient mechanism for sifting flour, insuring the pulverizing of all of the lumps therein and quickly effecting the sifting action, while the operator is protected against flying particles thereof. The cabinet also affords means whereby a vegetable-cutter may be conveniently supported and a meat-cutter, apple-parer, and cherry-stoner mounted to be accessible whenever desired by simply withdrawing the shelves upon which they are secured. The coffee mill and pots to be used for that purpose are mounted within a removable holder, so as to always be within convenient reach of the user and protected when not in use.

What I claim is—

1. A kitchen-cabinet provided with a bin pivotally mounted at its lower portion and there provided with a delivery-pocket, a rotatable casing to receive said bin, and a latch carried by the bin to engage said casing, as set forth.

2. A kitchen-cabinet comprising an upper compartment having at its opposite sides rotatable holders, each provided with retaining bins and shelves, a series of compartments beneath one of said holders, and a compartment disposed intermediate of the holders at the upper portion of the main compartment, as set forth.

3. A kitchen-cabinet comprising an upper compartment having at its opposite sides rotatable holders, each provided with retaining bins and shelves, a series of compartments beneath one of said holders, a compartment disposed intermediate of the holders at the upper portion of the main compartment, and slidingly-mounted boards disposed beneath the holders and compartments, as set forth.

4. A kitchen-cabinet comprising an upper compartment having at its opposite sides rotatable holders, each provided with retaining bins and shelves, a series of compartments beneath one of said holders, a compartment disposed intermediate of the holders at the upper portion of the main compartment, slidingly-mounted boards disposed beneath the holders and compartments, and opposite compartments provided at the lower portion of said casing, one of which has mounted therein a pivoted holder, and the other parallel slidingly-mounted boards disposed above a storage-receptacle, as set forth.

5. A kitchen-cabinet comprising, in combination with the casing, a kneading-board having flanges about the edges thereof and an elongated slot in the bottom of the board, and a waste-tray positioned beneath said board, as set forth.

In testimony whereof I hereunto affix my signature in the presence of two witnesses.

GEORGE WASHINGTON WYSOR.

Witnesses:
J. T. GRAHAM,
LILLIE BYUS.